United States Patent [19]

Zabrocki et al.

[11] 4,442,264
[45] Apr. 10, 1984

[54] GRAFT RUBBERS FOR MODIFYING THERMOPLASTIC MOULDING COMPOSITIONS

[75] Inventors: Karl Zabrocki, Buettgen; Alfred Pischtschan, Kuerten, both of Fed. Rep. of Germany

[73] Assignee: Bayer Aktiengesellschaft, Leverkusen, Fed. Rep. of Germany

[21] Appl. No.: 490,541

[22] Filed: May 2, 1983

[30] Foreign Application Priority Data

May 12, 1982 [DE] Fed. Rep. of Germany ....... 3217874

[51] Int. Cl.³ ............... C08L 51/04; C08L 55/02; C08L 279/02
[52] U.S. Cl. ................... 525/86; 525/75; 525/67; 525/66; 525/64; 525/85; 525/73; 525/74; 525/244; 525/292; 525/293
[58] Field of Search .................. 525/292, 293, 86

[56] References Cited

U.S. PATENT DOCUMENTS 3,047,534  7/1962  Dyer et al. ................... 525/292

*Primary Examiner*—Carman J. Seccuro
*Attorney, Agent, or Firm*—Connolly and Hutz

[57] ABSTRACT

This invention relates to graft rubbers obtained by the radical polymerization of one or more vinyl-group-containing monomers in the presence of at least one rubber, the polymerization reaction being carried out in the presence of from 0.001 to 1.0% by weight (based on solid graft product) of at least one compound corresponding to the following formula (I):

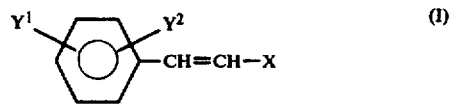

in which
  X = CL or $NO_2$
  $Y^1$, $Y^2$ = H, $C_1$–$C_{10}$-alkyl, $NO_2$, F, Cl, Br, and to the use of the graft rubbers according to the invention for the production of rubber-modified thermoplastic moulding compositions.

8 Claims, No Drawings

GRAFT RUBBERS FOR MODIFYING THERMOPLASTIC MOULDING COMPOSITIONS

This invention relates to graft rubbers which, in admixture with thermoplastic moulding compositions, give mouldings having increased toughness, and to a process for producing these graft rubbers.

In the context of this invention, graft rubbers are polymers produced by the radical polymerisation of at least one monomer containing vinyl groups in the presence of at least one rubber. It is known that, when graft rubbers of the type in question, also known as graft products, are added to thermoplastic moulding compositions, the toughness of mouldings produced from these compositions increases. For example, the addition of graft rubbers produced from polybutadien rubber and a mixture of styrene and acrylonitrile to styrene/acrylonitrile copolymers increases the toughness of the copolymers by a factor of from 5 to 15.

The toughness-increasing effect of a graft rubber depends on various factors. According to U.S. Pat. No. 3,793,403, toughness increases with the quantity of graft rubber used and its particle size, but to the detriment of other properties, for example surface quality. Accordingly, there is a need for graft rubbers in the form of relatively small particles which, when added in small quantities, produces an adequate improvement in toughness.

It has been found that graft rubbers obtainable by the radical polymerisation of a monomer containing vinyl groups or several such monomers in the presence of at least one rubber and in the presence of from 0.001 to 1.0% by weight (based on the solid graft product) of at least one compound corresponding to the following formula (I),

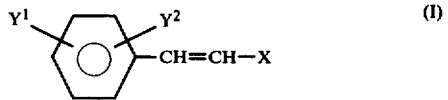

in which
X=$NO_2$, Cl,
$Y^1$, $Y^2$, which may be the same or different, represent H, $C_1$-$C_{10}$-alkyl, $NO_2$, F, Cl, Br,
exhibit the required property.

Basically, these graft rubbers may be produced by any known techniques, such as block polymerisation, solution polymerisation, suspension polymerisation or emulsion polymerisation; multistage processes, for example block polymerisation combined with suspension polymerisation, also being possible. It is preferred to use emulsion polymerisation in which a rubber is initially introduced in the form of a latex in the presence of which the monomers are subsequently polymerised. In this way, it is possible substantially or completely to suppress the formation of excessively coarse graft rubber particles which adversely affect surface quality. The results are particularly favourable when the rubber used is at least partly crosslinked.

The graft products are formed by a radical mechanism which is preferably initiated by means of radical-forming activators. Suitable radical-forming activators are the usual organic and inorganic peroxides, inorganic persulfates, azo-initiators and also redox systems, the redox systems consisting of an oxidizing agent, preferably peroxide(s), and a reducing agent with heavy metal ions additionally present in the reduction medium. Formation of the graft products is promoted by the presence of C=C-double bonds in the rubber.

The molecular weights of the graft branches may be adjusted in known manner by the addition of regulators, such as relatively long chain mercaptans, α-olefins or terpineols. The temperatures are generally in the range from 25° C. to 160° C. and preferably in the range from 40° C. to 90° C.

If the graft polymers are produced by block polymerisation, a solution of the uncrosslinked rubber, after undergoing phase inversion, is subjected to block or suspension polymerisation. The reaction conditions for block and suspension processes are generally known. In principle, it is also possible to graft partly crosslinked rubbers by block polymerisation after redispersion into a monomer phase, as described for exmaple in DE-OS No. 20 47 427.

Aromatic hydrocarbons may be used as the solvents where graft polymerisation is carried out in solution.

Grafting by the preferred method of emulsion polymerisation is carried out using standard emulsifiers, for example alkyl sulfates, aralkyl sulfonates, alkali salts of saturated and unsaturated fatty acids and also alkali salts of disproportionated or hydrogenated resinic acids, such as abietic or tall oil acids. In this case, activation is generally carried out by the addition of inorganic percompounds or redox systems.

If, in these processes, polymerisation is not continued to the point of complete conversion, the unreacted monomers and solvents may be removed by standard methods, for example by evaporation in a screw and by thin-layer evaporation, etc.

In solution, block and suspension processes, the graft products are directly obtained in the form of solid substances after the removal of volatile consituents and they may be further processed as such. Emulsion polymers may be precipitated, for example by the addition of salts and/or acids, washed and dried. However, it is also possible to mix graft products and, where available, thermoplastic matrix in the from of latices and to precipitate them together.

The rubbers used must have a glass temperature below 0° C. Suitable rubbers are, for example, diene rubbers, i.e. homopolymers of conjugated dienes containing from 4 to 8 carbon atoms, such as butadiene, isoprene, chloroprene or copolymers thereof with up to 60% by weight and preferably with from 1 to 30% by weight of a vinyl monomer, for example acrylonitrile, methacrylonitrile, styrene, α-methyl styrene, halogen styrenes, $C_1$-$C_4$-alkyl styrenes, $C_1$-$C_6$-alkyl acrylates and methacrylates, alkylene glycol diacrylates and methacrylates and also divinyl benzene;

acrylate rubbers, i.e. homo- and copolymers of $C_1$-$C_{10}$-alkyl acrylates, for example homopolymers of ethylene acrylate, butyl acrylate or copolymers with up to 40% by weight and preferably with no more than 10% by weight of monovinyl monomers, for example styrene, acrylonitrile, vinyl butyl ether, acrylic acid (esters), methacrylic acid (esters), vinyl sulfonic acid. It is preferred to use acrylate rubber homopolymers or copolymers containing from 0.01 to 8% by weight of divinyl or polyalkyl compounds and/or N-methylol acrylamide (or methacrylamide) derivatives which act as crosslinking agents, for example divinyl benzene, triallyl cyanurate, the rubber containing C=C-double bonds.

terpolymer rubbers, i.e. copolymers of monoolefinic hydrocarbons, for example ethylene, propylene, and dienes, for example butadiene and cyclopentadiene.

It is preferred to use polybutadiene rubbers, SBR-rubbers containing up to 30% by weight of copolymerised styrene and acrylate rubbers, particularly those having a core/shell structure as described in DE-OS No. 30 06 804, and also EPDM-rubbers.

In the case of emulsion polymerisation, the rubbers are used in the form of preformed particles of which the particle size is determined by the method used to produce the latex. Latices suitable for producing the graft products according to the invention are latices having average particle diameters of from 0.05 to 1.5 μm and preferably from 0.1 to 0.6 μm, measured as the $d_{50}$-value of the particle size distribution by ultracentrifuge measurement using Svedberg's method (cf. DE-OS No. 12 69 360). Mixtures of several latices may also be used (cf. DE-OS No. 18 13 719).

According to the invention, the graft polymers may be produced by polymerising the graft monomers in the presence of the rubber, also known as the graft base, and in the presence of one or more compounds corresponding to general formula (I).

Vinyl-group-containing monomers containing from 1 to 3 polymerisable double bonds are used individually or in admixture as the graft monomers. It is preferred to use compounds containing one vinyl group, for example styrene, $C_1$–$C_4$-alkyl-substituted styrenes, halogen-substituted styrenes, α-methyl styrenes, (meth)acrylonitrile, esters of (meth)acrylic acid with $C_1$–$C_8$-aliphatic or cycloaliphatic alcohols, glycidyl (meth)acrylate, hydroxy ethyl (meth)-acrylate, hydroxy propyl (meth)acrylate, (meth)acrylic acid, itaconic acid, mono- and bis-esters of maleic and fumaric acid and indene. Styrene, methyl methacrylate and mixtures of styrene and acrylonitrile are particularly preferred.

The graft monomers are used in quantities which amount to between 900 to 10 parts by weight and preferably to between 250 and 15 parts by weight of monomer (mixture) per 100 parts by weight of rubber (expressed as solid substance).

By varying this ratio and, optionally, by the addition of chain transfer agents and, where polymerisation is carried out in aqueous phase, also by suitably selecting the type and quantity of additives used, such a suspension stabilizers and emulsifiers, it is possible to adjust the degree of grafting G (=the mass of the polymer chemically bound to the graft base per unit mass of the graft base) and the length of the graft branches and also to influence the molecular weight of the chemically non-bound polymer formed as secondary product. These quantities are instrumental in determining the properties of the graft product: if graft products of the type in question are added in a predetermined quantity to thermoplasts, the toughness of the blend for example generally increases with increasing degree of grafting up to a maximum value and then decreases again. The positions of the maximum depends upon the quality of the rubber. Suitable degree of grafting are from 0.1 to 2.0 and preferably from 0.2 to 1.0. The molecular weight ($M_w$) of the free polymer obtained as secondary product during grafting is generally in the range from 15,000 to 250,000. According to the invention, from 0.001 to 1.0% by weight (based on solid graft polymer) of compounds corresponding to the following formula

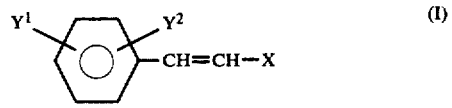

in which
X=NO$_2$, Cl, and
Y$^1$, Y$^2$=H, C$_1$–C$_{10}$-alkyl, NO$_2$, F, Cl, Br is added during the graft polymerisation reaction.

Examples of suitable compounds corresponding to formula I are β-nitrostyrene, 4,6-dimethyl-β-nitrostyrene, p-methyl-β-nitrostyrene, 2,6-dinitro-β-nitro sytrene, p-nitro-β-nitrostyrene; where X=Cl, the compound is weaker in its effect. Particular preference is attached to β-nitrostyrene (Y$^1$=H, Y$^2$=H, X=NO$_2$) for which the most suitable quantities are in the range from 0.01 to 0.20 part by weight per 100 parts of solid graft polymer.

The compound corresponding to formula (I) may be added to the mixture to be polymerised either gradually in the course of the reaction or all at once at the beginning of the graft polymerisation reaction. Where it is gradually added, the compound corresponding to formula (I) may be dissolved in the monomer (mixture). Particularly good results are obtained by adding the total quantity envisaged all at once at the beginning of the graft polymerisation reaction. In this case, the compound corresponding to formula (I) is best dissolved in a small quantity of monomer or in a suitable solvent, for example toluene, and the resulting solution added to and mixed with the rubber.

The graft products according to the invention may be used as modifiers for increasing the toughness of individual thermoplastic moulding compositions or thermoplastic moulding compositions mixed from various materials. Examples of modifiable thermoplastic moulding compositions are:

(a) homo- and copolymers of styrene and alkyl-substituted styrene with vinyl-group-containing monomers, for example polystyrene, poly(p-methyl)-styrene, poly(styrene-co-acrylonitrile), poly(α-methyl styrene-co-acrylonitrile), poly(styrene-co-maleic acid anhydride), poly(styrene-co-acrylonitrile-co-maleic acid-N-phenyl imide);

(b) homo- and copolymers of C$_1$–C$_4$-alkyl-(meth)acrylates with vinyl-group-containing monomers, for example polymethyl methacrylate and poly(-methylmethacrylate-co-acrylonitrile);

(c) halogen-containing polymers, for example polyvinyl chloride, polyvinylidene chloride and chlorinated polyethylene;

(d) polycarbonates, for example based on bisphenol A, tetramethyl bisphenol A and tetrabromobisphenol A;

(e) polyesters, for example based on terephthalic acid, isophthalic acid, ethylene glycol and butane diole, (f) polyamides, for example based on ε-caprolactam, lauric lactam, adipic acid/hexamethylene diamine.

Particularly favourable results are obtained in moulding compositions according to (a) and (b), particularly in styrene-acrylonitrile copolymers. In this case, ABS-products characterised by extreme toughness and high surface quality are formed if graft products containing styrene and acrylonitrile in grafted form are used.

For modifying moulding compositions, the graft rubbers according to the invention are used in quantities of from 1 to 80% by weight and preferably in quantities of from 5 to 50% by weight, based on the total moulding composition.

Standard mixing units, such as roll stands, mixing extruders, internal kneaders, may be used for their production. Necessary additives or additives appropriate to the particular application, for example oxidation inhibitors, antistatic agents, lubricants, flameproofing agents, fillers, and reinforcing materials and pigments may be added to the moulding composition during mixing or at other stages of working up, further processing and final forming.

The modified moulding compositions may be thermoplastically formed in standard processing machines, for example by injection moulding, sheet extrusion followed by hot forming or extrusion (for tubes and profiles).

The invention is illustrated by the following Examples, wherein parts are always parts by weight and percentages always percentages by weight unless otherwise indicated.

EXAMPLES

Comparison Test (a), Examples 1 to 3

50 parts (expressed as solid substance) of an anionically emulsified polybutadiene latex produced by radical polymerisation and having a $d_{50}$-value of approximately 0.27 μm were adjusted with water to a solids content of approximately 20% and the quantities indicated in Table I of β-nitrostyrene (expressed as solid substance) in the form of a 30% solution in toluene were stirred in.

The mixture was heated to approximately 65° C., 0.5 part of $K_2S_2O_8$ was added and then 50 parts of a mixture of styrene/acrylonitrile (72:28) and 2 parts (expressed as solid substance) of the sodium salt of a mixture of resin acids, dissolved in alkalised water, introduced over a period of 4 hours. Following an after-reaction time of 4 hours at 65° C., the graft latex was coagulated with $MgSO_4$ after the addition of approximately 1.0 part of a phenolic oxidation inhibitor and, after washing, the resulting powder was dried in vacuo at 70° C.

50 parts of this graft polymer were mixed with 50 parts of a styrene/acrylonitrile resin (72:28), $M_w$ approximately 115,000; Tyril 790, a product of the Dow Chemical Company), 2 parts of ethylene diaminebis-stearoyl amide and 0.2 part of a silicone oil in an internal kneader and the resulting mixture was subsequently injection-moulded to form standard small test bars and a plate (for assessing gloss). The results are set out in Table I. Gloss is assessed in accordance with DE-OS No. 24 20 358.

TABLE I

| | Comparison Test a) | Examples 1 | 2 | 3 |
|---|---|---|---|---|
| Quantity of β-nitro-styrene added (parts) | — | 0.05 | 0.10 | 0.20 |
| Notched impact strength according to DIN 53543 [KJ/m²] | | | | |
| 20° C. | 20.8 | 21.7 | 24.5 | 27.7 |
| −40° C. | 14.2 | 14.2 | 15.0 | 14.3 |
| Ball indentation hardness according to DIN 53546 [N/mm²] | 76 | 78 | 77 | 78 |
| Dimensional stability under heat according to Vicat B | 91 | 90 | 91 | 91 |
| Gloss (as assessed on the A-H scale) | F | F | E | D |

Comparison Test b, Examples 4 to 5

50 parts (expressed as solid substance) of an anionically emulsified polybutadiene latex produced by radical polymerisation and having a $d_{50}$-value of approximately 0.27 μm were adjusted to a solids content of approximately 20% and the quantities indicated in Table II of β-nitrostyrene (expressed as solid substance) in the form of a 30% solution in toluene were stirred in. 0.75 part of dextrose and traces of completed $Fe^{2+}$-ions were then added, followed by heating to 50° C. Thereafter 50 parts of a mixture of styrene and acrylonitrile (72:28) and a dilute alkalised aqueous emulsion of 0.2 parts of diisopropyl benzene hydroperoxide and 2.0 parts of resin acid soap were simultaneously introduced over a period of approximately 3 hours. The reaction product is kept at 65° C. for a while and then worked up, converted into a moulding composition and tested in the same way as in Examples 1 to 3. The results are set out in Table II.

TABLE II

| | Comparison Test b) | Examples 4 | 5 |
|---|---|---|---|
| Quantity of β-nitro-styrene added (parts) | — | 0.05 | 0.10 |
| Notched impact strength according to DIN 53543 [KJ/m²] | | | |
| 20° C. | 20.4 | 22.5 | 25.1 |
| −40° C. | 11.5 | 13.3 | 16.5 |
| Ball indentation hardness according to DIN 53546 [N/mm²] | 62 | 63 | 64 |
| Dimensional stability under heat according to Vicat B | 88 | 88 | 88 |
| Gloss (as assessed on the A-H scale) | F | E | D |

We claim:

1. A graft rubber obtainable by the radical polymerisation of one or more vinyl-group-containing monomers in the presence of at least one rubber, wherein polymerisation is carried out in the presence of from 0.001 to 1.0% by weight (based on solid graft product) of at least one compound corresponding to the general formula (I)

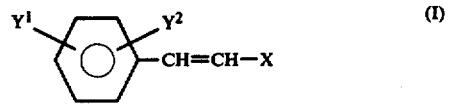

in which
X represents Cl or $NO_2$;
$Y^1$ and $Y^2$, which may be the same or different, represent H, $C_1$–$C_{10}$-alkyl, $NO_2$, F, Cl or Br.

2. A graft rubber according to claim 1, wherein the one or more vinyl-group-contaning monomers are selected from styrene and alkylstyrenes, acrylonitrile, methacrylonitrile, acrylic and methacrylic acid esters and mixtures of these monomers.

3. A graft rubber according to claim 1, wherein the rubber is a polybutadiene, styrene-butadiene copolymer or acrylate rubber, a graft rubber according to claim 1, wherein the rubber contains C=C-double bonds.

4. A graft rubber according to claim 1, wherein the compound of general formula (I) is β-nitrostyrene.

5. A process for preparing a graft rubber which comprises subjecting to radical polymerisation one or more vinyl-group-containing monomers in the presence of at least one rubber and in the presence of from 0.001 to 1.0% by weight (based on solid graft product) of at least one compound corresponding to the general formula (I)

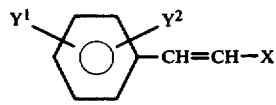

(I)

in which

X represents Cl or NO$_2$;

Y$^1$ and Y$^2$, which may be the same or different, represent H, C$_1$–C$_{10}$-alkyl, NO$_2$, F, Cl or Br.

6. A process according to claim 5, wherein the one or more vinyl-group-containing monomers are selected from styrene and alkylstyrenes, acrylonitrile, methacrylonitrile, acrylic and methacrylic acid esters and mixtures of these monomers.

7. A process according to claim 5, wherein the rubber is a polybutadiene, styrene-butadiene copolymer or acrylate rubber, a process according to claim 5, wherein the rubber contains C=C-double bonds, a process according to claim 5, wherein polymerisation is carried out in emulsion, a process according to claim 5, wherein the compound of general formula (I) is β-nitrostyrene.

8. A rubber-modified thermoplastic moulding composition comprising from 1 to 80% by weight (based on the final mixture) of a graft rubber according to claim 1 or as prepared by a process according to claim 5.

* * * * *